(12) United States Patent
Hickman

(10) Patent No.: US 6,578,425 B2
(45) Date of Patent: Jun. 17, 2003

(54) APPARATUS AND METHOD FOR VERIFYING THE DYNAMIC STIFFNESS CAPABILITY OF HYDRAULIC SERVO ACTUATORS

(75) Inventor: Alan B. Hickman, Cave Creek, AZ (US)

(73) Assignee: Honeywell Inc., Morristown, NJ (US)

( * ) Notice: Subject to any disclaimer, the term of this patent is extended or adjusted under 35 U.S.C. 154(b) by 52 days.

(21) Appl. No.: 09/867,152

(22) Filed: May 29, 2001

(65) Prior Publication Data

US 2002/0178825 A1 Dec. 5, 2002

(51) Int. Cl.[7] ............................................. G01L 15/00
(52) U.S. Cl. ........................................ 73/716; 73/736
(58) Field of Search ...................... 73/700–756, 170.01, 73/170.05, 170.02; 244/178, 177, 78, 75, 82

(56) References Cited

U.S. PATENT DOCUMENTS

| | | | |
|---|---|---|---|
| 3,945,593 A | * 3/1976 | Schanzer | ...................... 244/181 |
| 4,106,730 A | * 8/1978 | Spitzer et al. | ............... 244/182 |
| 4,382,281 A | * 5/1983 | Fowler et al. | ............ 244/17.13 |
| 4,496,121 A | 1/1985 | Berlin | |
| 4,510,428 A | 4/1985 | Dunne | |
| 4,555,974 A | 12/1985 | Mason et al. | |
| 4,598,890 A | 7/1986 | Herzog et al. | |
| 5,135,186 A | 8/1992 | Ako | |
| 5,351,914 A | * 10/1994 | Nagao et al. | ................ 244/194 |
| 5,374,014 A | 12/1994 | Traverse | |
| 5,616,861 A | * 4/1997 | Hagen | ..................... 73/170.02 |
| 5,634,389 A | 6/1997 | Horan et al. | |
| 5,881,971 A | * 3/1999 | Hickman | ..................... 244/195 |
| 6,439,512 B1 | * 8/2002 | Hart | ........................... 244/178 |

* cited by examiner

Primary Examiner—Hezron Williams
Assistant Examiner—Andre Allen

(57) ABSTRACT

The dynamic stiffness of a flight control actuator is assessed by providing an actuator control system that includes an actuator and a portion of the actuator is coupled to an aircraft control surface. A command signal is applied to the actuator control system, which causes the production of a pressure differential across the actuator in response to the command signal that is based on the ability of the actuator to react to an inertial load generated by an acceleration of the aircraft control surface. A pressure signal representative of the pressure differential across the actuator is processed and the pressure signal is compared to known pressure differential values produced under similar conditions for specific actuator and specific control surface combinations.

29 Claims, 3 Drawing Sheets

APPARATUS AND METHOD FOR VERIFYING THE DYNAMIC STIFFNESS CAPABILITY OF HYDRAULIC SERVO ACTUATORS

BACKGROUND OF THE INVENTION

The invention relates to an apparatus and method for assessing the dynamic stiffness capability of a hydraulic actuator, and more particularly, to a method of assessing the capability of a hydraulic flight control actuator to provide sufficient dynamic stiffness for limiting control surface flutter while installed on an aircraft.

In typical flight-by-wire flight control systems, fluid driven flight control actuators are widely known and used. These actuators can be linear or rotary devices, and typically include at least one cylinder divided into two variable volume chambers by a piston. In conventional systems, the piston supports a piston rod that is attached to an aircraft control surface. Fluid pressure can be selectively applied to one or both chambers through a servo valve or other similar valve to drive the piston for repositioning the control surface to which the piston rod is attached.

An important property of flight control actuators is their dynamic stiffness capabilities, i.e., the ability of the fluid in the actuator to react to external loads to resist movement of the control surface. That is, the dynamic stiffness of a flight control actuator is the ability of the actuator to react to the inertial load generated by unwanted attempts to accelerate the control surface. And, more importantly, control surface flutter is prevented by the ability of the flight control actuator to provide a stiff connection between the control surface and the aircraft structure. Thus, it is highly desirable in aircraft systems to monitor the stiffness capability of flight control actuators, as failures within the actuator can result in a significant reduction in the dynamic stiffness of the actuator.

Rather than assessing an actuator's dynamic stiffness capabilities directly, aircraft in service today perform automated tests to measure a related parameter and then infer from this data an actuator's ability to provide sufficient stiffness. For instance, in flight by wire control systems the dynamic stiffness of an actuator can be inferred based on the damping force capability of the actuator. For a given actuator design, the manufacturer determines an acceptable range of damping force values over which the actuator can normally operate. If the actuator is determined to operate within the acceptable damping force range, the dynamic stiffness of the actuator is presumed to be acceptable.

The damping force ($F_{damp}$) provided by an actuator equals the differential pressure (DP) across the actuator piston multiplied by the piston area ($A_p$), $F_{damp}=DP*A_p$. For a given actuator design, the piston area ($A_p$), the area of the damping orifice ($A_{orifice}$), and the flow constant ($K_q$) determined by fluid and orifice properties are often known, and the flow rate (Q) of the hydraulic fluid through the damping orifice is equal to the rate at which the piston is moving multiplied by the piston area ($A_p$), $Q=(A_{orifice})*K_q(DP)^{1/2}$. Solving for DP:

$$DP=Q^2/(A_{orifce}*K_q)^2$$
$$F_{damp}=A_p*DP$$
$$F_{damp}=A_{orifice}*K_q$$
$$F_{damp}=A_p*(Rate*A_p)^2/(A_{orifice}*K_q)^2.$$

Thus, the damping force is proportional to the rate squared.

The above referenced equation and analysis is performed on an actuator while in the damping mode. It has always been assumed that if the actuator performed satisfactorily in the damping mode according to the above formula, the actuator was also acceptable in the active mode. However, analysis data shows that a small leakage path across the actuator in the active mode, while resulting in small changes in the damping force ($F_{damp}$), may result in significant changes in the dynamic stiffness. Thus, it may be desirable to assess directly the dynamic stiffness capability of a particular actuator to limit the flutter of a particular aircraft control surface.

BRIEF SUMMARY OF THE INVENTION

The invention relates to an apparatus and method for verifying the stiffness capabilities of a flight control actuator. The apparatus comprises known sensors, electronics and hydraulic components.

A method for assessing the dynamic stiffness of a flight control actuator using the apparatus of the present invention can include the steps of (1) providing a control surface actuator system including an actuator having a portion thereof coupled to an aircraft control surface; (2) applying a command signal to the actuator control system, causing the production of a pressure differential across the actuator in response to the command signal based on the ability of the actuator to react to an inertial load generated by the attempted acceleration of the control surface; and (3) processing a pressure signal representative of the pressure differential produced across the actuator. The method can further include the step of comparing the pressure signal to known pressure differential values produced under similar conditions for specific actuator and control surface combinations.

BRIEF DESCRIPTION OF THE DRAWINGS

The present invention will hereinafter be described in conjunction with the appended drawing figures, wherein like numerals denote like elements, and.

DETAILED DESCRIPTION OF A PREFERRED EXEMPLARY EMBODIMENT

The present invention provides an apparatus and method for assessing the capability of a flight control actuator to provide dynamic stiffness for constraining control surface flutter. In general, the apparatus and method includes a combination of various subsystems: electronics control and hydraulics, which become interrelated via various electrical and hydraulic circuitry.

The ability of an actuator to provide dynamic stiffness can be evaluated by rapidly injecting hydraulic fluid into the actuator cylinder and evaluating the resulting pressure differential. The present invention accomplishes this by implementing a test command sequence, signal measurement and signal processing using standard sensors and electronics found in present day flight-by-wire flight control systems. Although, the present invention is particularly useful for assessing the dynamic stiffness capability of a hydraulic flight control actuator in a typical flight-by-wire control system, the invention can be used to evaluate the stiffness capability of an electrically or pneumatically controlled actuator by coupling the actuator to a source of power for applying a pressure surge that attempts to excite movement of the control surface.

A detailed description of the present invention is set forth herein with reference to the accompanying figures. Terms of reference such as "front," "back" or "end," are used to facilitate an understanding of the present invention in view of the accompanying figures. The identified reference terms or other similar terms are not intended to be limiting, and one of ordinary skill in the art will recognize that the present invention can be practiced in a variety of spatial orientations without departing from the spirit and scope of the invention.

Figure 1:
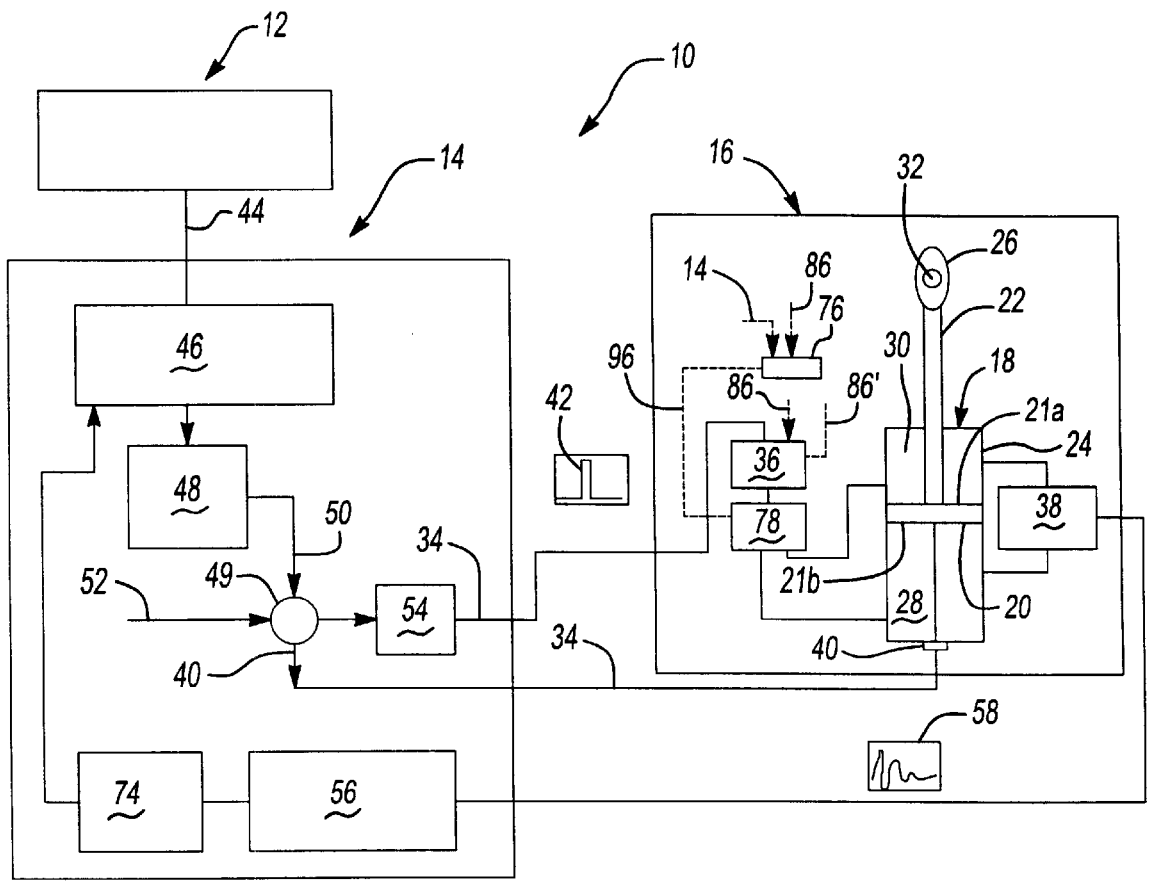
FIG. 1 is a schematic diagram of an apparatus and system formed in accordance with the teachings of this invention for assessing the dynamic stiffness capability of a hydraulic actuator while installed on an aircraft via a control surface.
Figure 2:
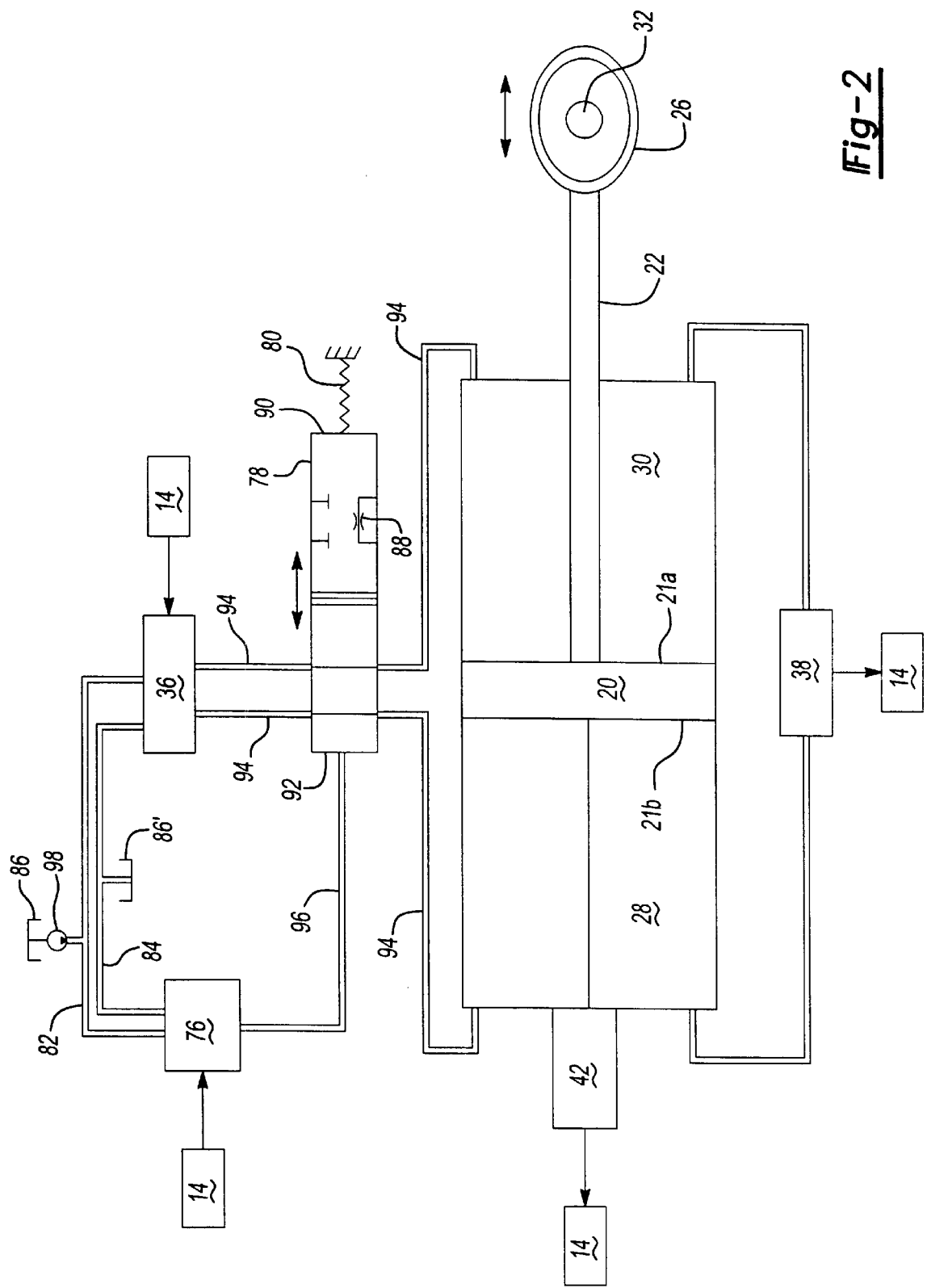
FIG. 2 is a schematic diagram of the actuator control system comprising the apparatus shown in FIG. 1.

FIG. 1 illustrates one embodiment for an apparatus 10 and method for assessing the dynamic stiffness capability of a flight control surface actuator formed in accordance with the teachings of this invention. As best seen in FIGS. 1 and 2, the apparatus 10 and method include a digital flight computer 12, an actuator control electronics system 14, and an actuator control system 16.

Turning first to a discussion of the digital flight computer 12, the digital flight computer 12 is of a type known and used in the industry, and thus a detailed description of its structure is not depicted in FIG. 1. For example, the digital flight computer 12 could be a processor including one or more function blocks supporting hardware encoded or programmed with logic commands for controlling the function and operation of the aircraft, and any number of individual microprocessors, memories, storage devices, interface cards and other processor components.

With respect to the apparatus 10 and method, the digital flight computer 12, in addition to other hardware and software, includes hardware and software for verifying the status of the aircraft, i.e., whether the aircraft is in an in-flight situation. The digital flight computer 12 also includes hardware and software for transmitting, receiving and processing signals to and from the actuator control system 16 (discussed in more detail below). The digital flight computer 12 also includes hardware and software for receiving and processing signals to and from the actuator control electronics system 14.

As best seen in FIG. 1, a conventional digital data bus 44 couples the digital flight computer 12 in operable communication to the actuator control electronics 14. More specifically, the digital data bus 44 is electrically coupled to a conventional digital data bus interface 46 using known techniques. As best seen in FIG. 1, the digital data bus interface 46 is an element of the actuator control electronics system 14. As the digital data bus 44 and the digital data bus interface 46 are known and used in the industry, the particular structure of neither component is shown in FIG. 1.

As best seen in FIG. 1, the actuator control electronics system 14 also includes a digital to analog converter 48, the input of which is electrically coupled to the digital data bus interface 46. As is generally conventional, the digital to analog converter 48 converts digital data received from the digital data bus interface 46 to an analog signal for transmission to the actuator control system 16.

More specifically, the output from the digital to analog converter 48 is directed to a conventional summer 49. The summer 49 can receive a test input signal 50 from the digital to analog converter 48, a pilot command signal 52, and a signal from an actuator position feedback sensor 40 (discussed in more detail below). The pilot command signal 52 transmits pilot input commands (e.g., commands from the pilot to adjust the control surface) to the actuator control electronics system 14, and the actuator control electronics system 14 manipulates the aircraft controls accordingly. The actuator position feedback sensor 40 measures the position of the piston 20 (discussed below) with the actuator chamber 24 (discussed below). It will be appreciated that the pilot command signal 52 and the actuator feedback sensor 40 are generally known in the field of avionics, and the function and purpose of these components is understood by those of ordinary skill in the art; thus, the specific structure of each are not set forth in detail herein. The output of the summer 49 is directed to a conventional amplifier circuit 54, which increases the amplitude of the input signal, and supplies an input signal to the servo valve 36 (discussed below) via electrical lines 34.

As shown in FIG. 1, the actuator control electronics system 14 also includes an analog to digital converter 74 for converting an analog signal input from the actuator 12 to a digital signal. The digital signal is directed to digital flight computer 12 via the digital data bus interface 46, as best seen in FIG. 1.

The input to the analog to digital converter 74 is received from a filter 56, wherein the filter 56 processes a differential pressure signal 58 from the pressure sensor 38 (discussed below). As best seen in FIG. 1, electrical lines 34 establish electrical communication between the pressure sensor 38 and the filter 56.

Figure 3:
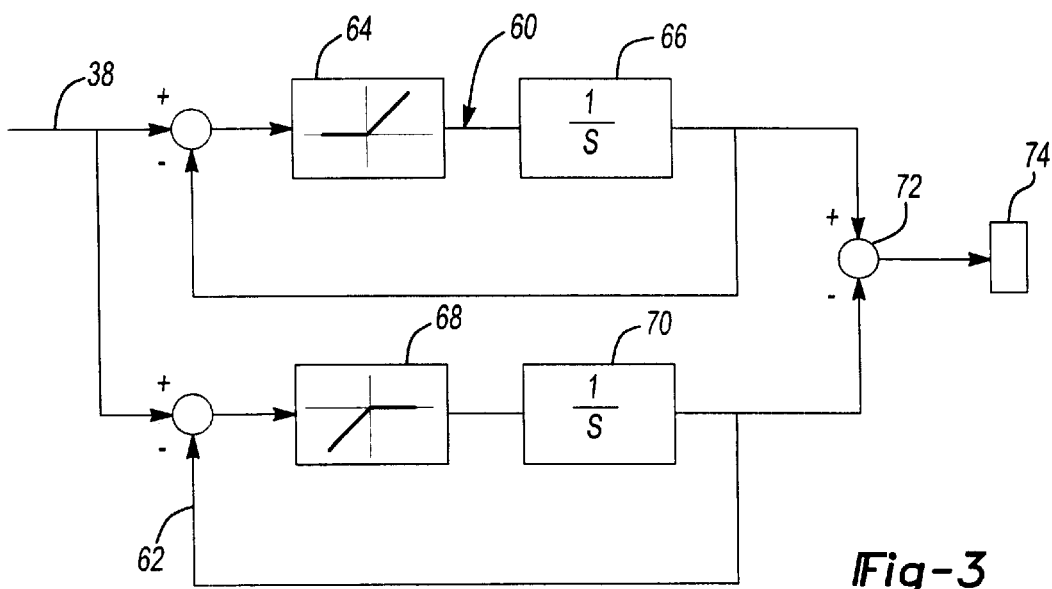
FIG. 3 is a schematic diagram of a filter comprising a portion of the apparatus shown in FIG. 1.
Figure 4:
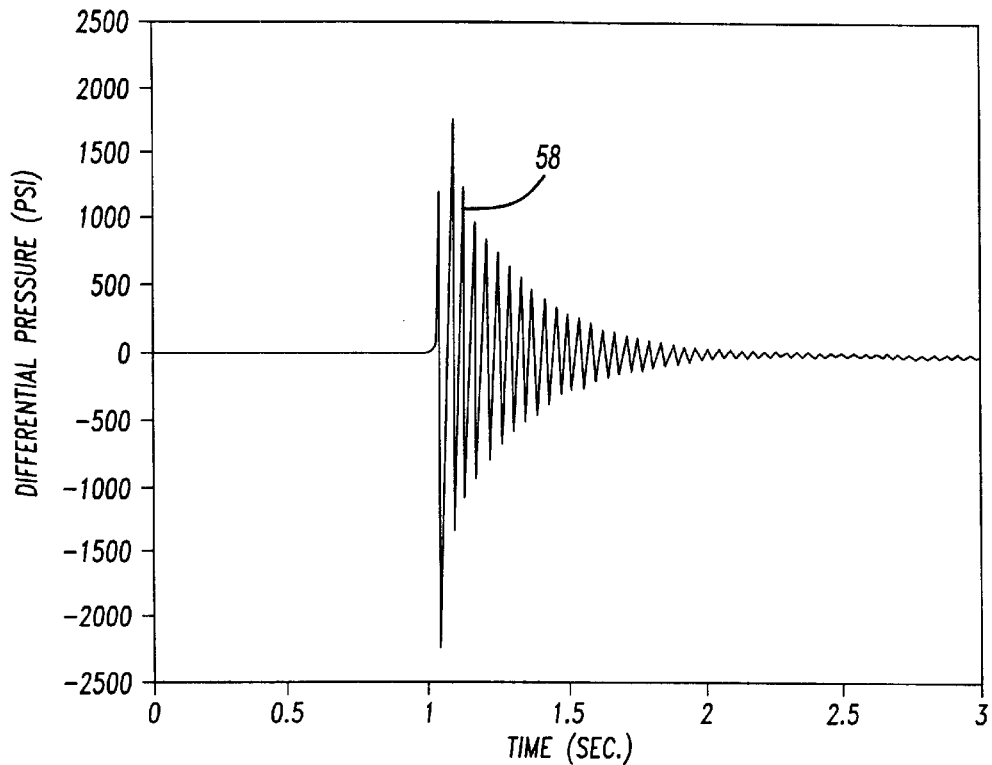
FIG. 4 shows a representative differential pressure signal for an actuator operating within acceptable dynamic stiffness ranges.
Figure 5:
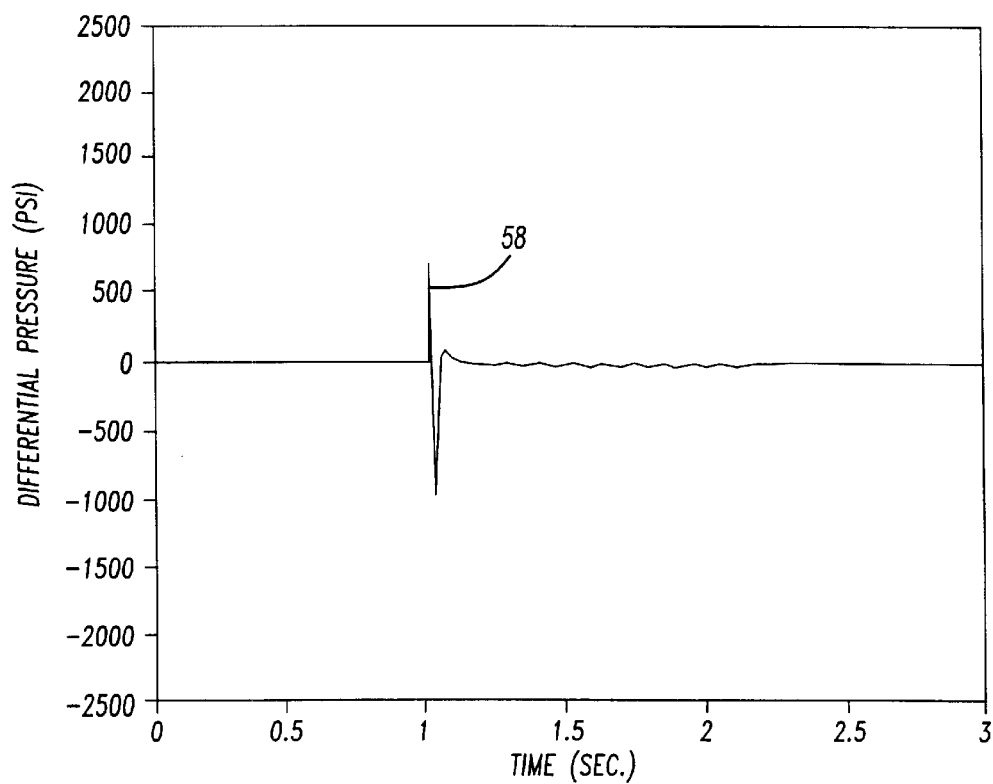
FIG. 5 shows a representative differential pressure signal for an actuator not operating within acceptable dynamic stiffness ranges.

As best seen in FIG. 3, the filter 56 includes a first portion 60 for processing the positive portion of the differential pressure signal 58, wherein a typical differential pressure transient for an acceptable actuator is shown in FIG. 4 as a rapidly decaying harmonic signal, and a typical differential pressure signal 58' for an unacceptable actuator is shown in FIG. 5. As shown in FIG. 3, the first portion 60 includes a filter 64 for separating out the positive portion of the signal shown in FIG. 4. The filter 64 is electrically coupled to an integrator 66 for determining the value of the positive portion of the pressure signal.

The filter 56 also includes a second portion 62 for processing the negative portion of the pressure transient signal 58. The second portion 62 includes a filter 68 for separating out the negative portion of the signal shown in FIG. 4. The filter 68 is electrically coupled to an integrator 70 for determining the value of the negative portion of the pressure signal shown in FIG. 4.

The output of the integrators 66 and 70 are input into a summer 72, wherein the difference between the value of the negative and positive portions of the pressure signal is determined. As shown in FIG. 1, this difference value is directed to the analog to digital converter 52 and directed to the digital flight computer 12 via the digital data bus 44.

Now referring back to FIG. 1, the flight control actuator 16 can include an actuator 18, servo valve 36, a pressure sensor 38 and the actuator position feedback sensor 40. Preferably, the actuator 18 is a conventional hydraulic piston-cylinder having a piston 20 disposed within an actuator cylinder 24 for reciprocal movement within the cylinder 24. The piston 20, in accordance with generally known techniques, divides the internal portion of the actuator cylinder 24 into first and second fluid chambers 28, 30, respectively.

As shown in FIGS. 1 and 2, the front surface 21a of the piston 20 supports a piston rod 22 such that the piston rod 22 extends beyond the actuator cylinder 24. It will be appreciated that the piston rod 22 is attached to the piston 20 in accordance with known techniques, and the opposite end of the piston rod 22 is secured to a control surface 26 at a fixture point 32 such that movement of the piston rod 22 causes a corresponding movement of the control surface 26. It will be appreciated that the control surface 26 can be an elevator, rudder, flap, aileron or other aircraft surface, and that the control surface 26 can be attached to the piston rod 22 using fasteners such as bolts, screws, rivets or other known fastening techniques.

As best seen in FIG. 2, hydraulic fluid lines 94 establish fluid communication between the actuator 18 and a mode valve 78. The mode valve 78 can be a conventional spool valve of the type known and used in the industry. As best seen in FIG. 2, the mode valve 78 is a 2-position valve having a first position (active mode) and a second position (damping mode). In the first position or active mode, the mode valve 78 permits fluid to flow into the first and second chambers 28, 30 fluid via fluid lines 94. In the second position or damping mode, flow is blocked through the mode valve 78; however, fluid communication is established between the first and second fluid chambers 28, 30 via a damping orifice 88.

As is conventional, the damping orifice 88 permits a small volume of fluid to flow from either the first or second fluid chamber 28, 30 in response to a pressure differential between the first and second fluid chambers 28, 30. It will be appreciated that the direction of fluid flow will depend on the pressure condition of the first and second fluid chambers 28, 30. It will be understood that the pressure in the first and second fluid chambers 28, 30 can be the same, different or equal depending on the state, e.g., active, damping, etc., of the actuator 18.

As best seen in FIG. 2, a spring 80 such as a coil spring is attached to an end 90 of the mode valve 78 for biasing the mode valve 78 in the damping mode. The opposite end 92 of the mode valve 78 is operably coupled to a solenoid valve 76 (discussed in more detail below) via fluid line 96. When the solenoid valve 76 is activated, a hydraulic pressure is applied to the opposite end 92, thus compressing the spring 80 and shuttling the mode valve 78 to the right so as to permit flow though the mode valve 78.

Turning now to a discussion of the solenoid valve 76, the solenoid valve 76 is of a type generally known and used in the industry. One of skill in the art would readily understand the structure and function of such a valve; thus, the specific structure of the solenoid valve is not disclosed in FIG. 2. For instance, the solenoid valve could be a spring-biased 2-position spool valve, wherein the solenoid valve is biased in a fluid blocking position to prevent fluid flow through the solenoid valve 76. Upon application of a voltage to the spool, the spool can shift to the second position, permitting flow through the solenoid valve 76.

As best seen in FIG. 2, the solenoid valve 76 is controlled by an electrical signal from the actuator control electronics system 14. Activation of the solenoid valve 76 establishes fluid communication between the solenoid valve 76 and the mode valve 78, and causes the solenoid valve 76 to shift the mode valve 78 to the right in the manner previously described.

As shown in FIG. 2, the solenoid valve 76 is coupled to the hydraulic fluid reservoir 86 by hydraulic pressure lines 82, and to a hydraulic fluid return reservoir 86' by hydraulic return lines 84. It will be appreciated that the hydraulic fluid reservoir 86 and the return reservoir 86' can be separate units or, preferably, a single unit.

Turning now to a discussion of the servo valve 36, as best seen in FIG. 2, it will be appreciated that servo valves are well known and apparent to one of ordinary skill in the art. The servo valve 36 can be a proportional flow control valve of the type available from MOOG, Inc. Controls Division located in East Aurora, N.Y. 14052. A proportional flow servo valve is one in which the direction and volume of flow through the valve is proportional to the electrical current applied to the valve 36.

As best seen in FIGS. 1 and 2, the servo valve 36 is controlled by an electrical signal received from the actuator control electronics system 14. The servo valve 36 will direct fluid flow into either the first or second chambers 28, 30 or both depending on the amount of current input to the valve 36 from the actuator control electronics system 14.

As best seen in FIGS. 1 and 2, the servo valve 36 has an active role in establishing operable communication between the electronics and hydraulics subsystems. As part of the hydraulics subsystem (FIG. 2), the servo valve 36 is coupled to a hydraulic fluid reservoir 86 via hydraulic fluid supply lines 82, and to a return reservoir 86' via return lines 84.

As shown in FIG. 2, a hydraulic pump 98 is disposed between the hydraulic fluid reservoir 86 and the supply lines 84, wherein the supply lines 84 supply fluid under pressure to both the solenoid valve 76 and the servo valve 36. It will be appreciated that the hydraulic pump 98 is of a type known and used in the industry, and, hence, its structure and operation would be known to one of skill in the art. For instance, the pump 98 could be a reciprocating piston pump, diaphragm pump, a rotary vane pump, rotary screw pump or a lobed rotor pump, or any other type of hydraulic pump used in the industry. The specific size and type of pump chosen will depend on the pressure and volume of fluid to be delivered to the solenoid and servo valves 76, 36, respectively, the size of the hydraulic piston-type actuator 18 and the size and structure of the control surface 26 to be manipulated.

Also, as best seen in FIG. 2, the servo valve 36 establishes fluid communication with the mode valve 78 via hydraulic supply lines 94. Consequently, when both the servo valve 36 and the mode valve 78 are active, fluid is permitted to flow into either one or both of the first or second chambers 28, 30.

Referring back to FIG. 1, the pressure sensor 38 is a type known and used in the industry, and thus the particular structure is not shown in FIG. 1 or 2. For instance, the pressure sensor 38 could be a pressure transducer having a pressure sensitive piezoelectric diaphragm in fluid communication with the first and second chamber 28, 30. It is well-known in the industry that a change in the piezoresistance of the diaphragm resulting from a strain applied to the diaphragm produces a differential resistance that can be used to determine a corresponding voltage that is proportional to the change in pressure. The pressure sensor 38 could also include one or more sensors associated with the first and second fluid chambers 28, 30, such the pressure of each of the first and second fluid chambers 28, 30 is measured independently and subsequently electrically added to obtain the pressure differential across the actuator 18. Regardless of the form of the pressure sensor 38, the pressure sensor 38 transmits a signal proportional to the differential pressure signal 58 to the actuator control electronics system 14.

The actuator position feedback sensor 40 is also of a type well-known to one of ordinary skill in the art; hence, the particular structure is not disclosed in FIG. 1 or 2. For instance, the actuator position feedback sensor 40 could be a conventional ram position sensor comprising a set of coils arranged in a linear array. As best seen in FIG. 2, one end of the position feedback sensor 40 is coupled the backside 21b of the piston 20, and the opposite end is coupled to the actuator control electronics system 14.

The actuator position feedback sensor 40 provides an electrical signal to the actuator electronics control system 14 that is determinative of the position of the piston 20 within the chamber 24. As best seen in FIG. 1, the position of the piston 20 is continuously monitored and a position signal returned to the actuator control electronics 14, wherein the actuator feed back signal is used to adjust the test input signal 50 at the summer 49.

A method of using the system 10 can include the following steps: To begin the test, the piston 20 is preferably positioned at the midpoint of the actuator cylinder 24 by adjusting the pressures in the first and second fluid chambers 28, 30 accordingly.

Next, the digital flight computer 12 can be caused to send a command signal to verify the status of the aircraft. If the status inquiry indicates that the aircraft is not in-flight, the digital flight computer 12 can direct a test signal command in the form of an electric pulse to the servo valve 36 via the actuator control electronics system 14. For instance, the digital flight computer 12 can cause a voltage signal to be directed to the servo valve 36, wherein the voltage signal is applied for a specified period of time. In one embodiment, the digital flight computer 12 commands a 3 volt signal to the servo valve 36 for a time period of ranging between 25 to 30 ms, preferably the pulse continues for a duration of 25 ms. It will be appreciated, however, that the duration of the pulse can depend on a variety of factors, including, but not limited to, the size and structure of the servo valve 36, the volume of fluid to be passed through the solenoid valve 76, etc.

Simultaneously with or prior to activating the servo valve 36, the solenoid valve 76 is activated by applying an electrical current thereto, wherein the electrical current is applied by the actuator electronics control system 14. When the solenoid valve 76 is active, a source of a hydraulic fluid under pressure is applied to the end 92 of the mode valve 78. In the disclosed embodiment, the solenoid valve 76 applies a pressure of 3000 psi to the end 92 of the mode valve 78. It will be appreciated that the pressure applied to the mode valve 78 will vary depending on the size and structure of the mode valve 78 to be controlled. This action causes the mode valve 78 to shift to the right, establishing a fluid flow path between the servo valve 36 and the hydraulic piston-type actuator 18.

When the servo valve 36 is in fluid communication with either the first or second fluid chamber 28, 30, the hydraulic pump 98 forces a small volume of hydraulic fluid out of the reservoir 86 under pressure. This small volume of hydraulic fluid creates a pressure pulse shown schematically in FIG. 1 by reference numeral 42. The pressure pulse 42 is preferably a rapid, quick pulse of a magnitude that attempts to cause the extension or retraction of the piston rod 22, depending on the fluid chamber 28, 30 into which the pressure pulse 42 is directed. In other words, by applying the pressure pulse 42 to the first or second fluid chamber 28, 30, the pressure within the actuator cylinder 24 will increase based on the ability of the fluid in the actuator cylinder 24 to react to the inertial load generated by the attempted acceleration of the control surface 26.

For example, if the pressure pulse 42 is directed into the first fluid chamber 28, the fluid pulse generates a pressure surge within the first fluid chamber 28 that attempts to extend the piston rod 22, which would result in a reposition of the control surface 26. This pressure surge also results in a measurable pressure differential between the first and second fluid chambers 28, 30.

The pressure sensor 38 measures the value of the pressure differential between the first and second fluid chambers 28, 30 in terms of a voltage differential. As best seen in FIG. 4, electronic signal 58 representing the voltage differential includes a significant spike followed by a rapidly decaying oscillation. The pressure sensor 38 sends the voltage signal 58, which is proportional to the pressure differential, to the actuator control electronics system 14 via electrical lines 34. In the actuator control electronics 14, the voltage signal is process by the filter 56 in the manner previously described, and transmitted to the digital flight control computer 12 via the digital data bus and data bus interface 44, 46, respectively.

The digital flight computer 12 compares the value of the differential pressure signal 58 to known aircraft manufacturers' data reporting pressure differential values for specific actuators when coupled to specific aircraft control surfaces. It will be appreciated that the values for acceptable and unacceptable actuator performance will be determined using known mathematical formula and criteria established by aircraft manufacturers and or governmental regulations.

In an alternative embodiment, the differential pressure signal 58 can be processed and evaluated by the actuator control electronics system 14. For instance, if the data transfer rate between the digital flight computer 12 and the actuator electronics system 14 is too slow the pressure differential signal can be processed by the actuator electronics system 14. For example, for a pressure differential signal 58 having a frequency ranging from 10 to 40 Hz, a data bus rate of approximately 100–400 Hz would preferably be required to process the pressure differential signal 58 in the digital flight computer 12. If this data rate is not available then the pressure differential signal 58 could be processed in the actuator electronics system 14. In this instance, the actuator control electronics 14 would be modified to include hardware and/or software necessary to evaluate the pressure differential signal 58. The actuator control electronics system 14 would also be modified to include hardware and/or software for comparing the value of the pressure signal to known manufacturers' data.

The preferred embodiment of the present invention has been disclosed. The explanations and illustrations presented herein are intended to acquaint others skilled in the art with the invention, its principles, and its practical application. A person of ordinary skill in the art would realize, however, that certain modifications would come within the teachings of this invention. Therefore, the following claims should be studied to determine the true scope and content of the invention.

What is claimed is:

1. A method for assessing the dynamic stiffness of a flight control actuator, said method comprising the steps of:
providing an actuator control system that includes an actuator having a portion thereof coupled to an aircraft control surface;
applying a command signal to the actuator control system that causes the production of a pressure differential across the actuator, which is based on the ability of the actuator to react to an inertia (load generated by an acceleration of the aircraft control surface;

processing a pressure signal representative of the pressure differential across the actuator; and comparing the pressure signal to known pressure differential values produced under similar conditions for specific actuator and specific control surface combinations.

2. The method defined in claim 1, further including the step of providing one or more pressure sensors for measuring the pressure differential across the actuator.

3. The method as defined in claim 1, further including the step of generating a pressure spike in response to the applying the command signal to the actuator control system.

4. The method defined in claim 3, wherein the generating the pressure spike comprises the step of supplying fluid under pressure to the actuator.

5. The method defined in claim 1, further including the step of providing a sensor for monitoring the position of the actuator within the actuator control system.

6. The method defined in claim 1, further including the step of providing an actuator electronics control system operably coupled to the actuator control system for performing the step of processing the pressure signal.

7. The method defined in claim 6, further including the step of providing a digital flight computer operably coupled to the actuator electronics control system for the comparing the pressure signal to known pressure differential values.

8. The method defined in claim 1, further including the step of providing a digital flight computer for processing the pressure signal and comparing the pressure signal to known pressure differential values.

9. A method for assessing the dynamic stiffness of a flight control actuator, said method comprising the steps of:

providing an actuator control system having an actuator coupled to an aircraft control surface;

providing actuator control electronics operably coupled to the actuator control system;

providing a digital flight computer operably coupled to the actuator control system;

applying a command signal to the actuator control system, wherein the command signal causes a pressure spike to be applied to the actuator, wherein the pressure spike causes an acceleration of the aircraft control surface coupled to the actuator;

measuring a pressure differential generated across the actuator by the pressure spike;

processing the pressure differential with the actuator control electronics to produce a processed pressure differential signal;

transmitting the processed pressure differential signal to the digital flight computer for comparison to known actuator-control surface pressure differential values; and determining the acceptability of the actuator to provide dynamic stiffness for limiting control surface flutter based on the comparison to known actuator-control surface pressure differential values.

10. The method defined in claim 9, including the step of providing a pressure sensor for measuring the pressure differential generated across the actuator.

11. The method defined in claim 9, further including the step of coupling the actuator to a source of hydraulic fluid for generating the pressure spike.

12. The method defined in claim 11, wherein the generating the pressure spike comprises the step of directing the hydraulic fluid into the actuator control system.

13. The method as defined in claim 9, further including the step of providing a sensor for monitoring the position of a piston within an actuator cylinder.

14. The method defined in claim 9, further including the step of providing a servo valve in fluid communication with the actuator for providing the pressure spike to the actuator.

15. The method defined in claim 14, further including the step of electrically coupling the servo value to the actuator control electronics.

16. The method defined in claim 9, further including the step of providing a mode valve in fluid communication with the servo valve and the actuator such that the mode valve permits fluid from the servo valve to flow to the actuator.

17. The method defined in claim 16, further including the step of providing a solenoid valve for providing fluid pressure for positioning the mode valve.

18. The method defined in claim 17, further including the step of electrically coupling the solenoid valve to the actuator control electronics.

19. The method defined in claim 16, further including the step of configuring the mode valve as a 2-position valve having an active mode and a damping mode.

20. An apparatus for assessing the dynamic stiffness of a flight control actuator, comprising:

an aircraft control surface;

an actuator control system that includes an actuator having a portion thereof coupled to the aircraft control surface; and a processor in operable communication with the actuator control system, the processor configured to:

generate a command signal for the actuator control system that causes the production of a pressure differential across the actuator, which is based on the ability of the actuator to react to an inertial toad generated by an attempted acceleration of the aircraft control surface;

process a pressure signal representative of the pressure differential produced across the actuator; and compare the pressure signal to known pressure differential values produced under similar conditions for specific actuator and specific control surface combinations.

21. The apparatus defined in claim 20, wherein the actuator control system cooperates with a power source for generating a pressure spike in the actuator in response to the command signal.

22. The apparatus defined in claim 21, wherein the power source is a hydraulic pump for supplying fluid under pressure to the actuator.

23. The apparatus defined in claim 22, wherein the actuator control system further includes a servo valve in fluid communication with the actuator.

24. The apparatus defined in claim 23, further including a mode valve in fluid communication with the servo valve and the actuator such that the mode valve permits fluid from the servo valve to flow to the actuator.

25. The apparatus defined in claim 24, further including a solenoid valve for providing fluid pressure for positioning the mode valve, wherein the mode valve can be positioned to permit fluid flow or to block fluid flow to the actuator.

26. The apparatus defined in claim 20, wherein the actuator includes an actuator cylinder divided into a first fluid chamber and a second fluid chamber by a piston, the first fluid chamber and the second fluid chamber being coupled to a fluid source and the piston supporting a piston rod coupled to the aircraft control surface.

27. The apparatus defined in claim 20, further including a pressure sensor for measuring the pressure differential across the actuator.

28. The apparatus defined in claim 20, further including a sensor for monitoring the position of the actuator.

29. The apparatus defined in claim 20, wherein the processor is a digital flight computer.

* * * * *